Figure 1:
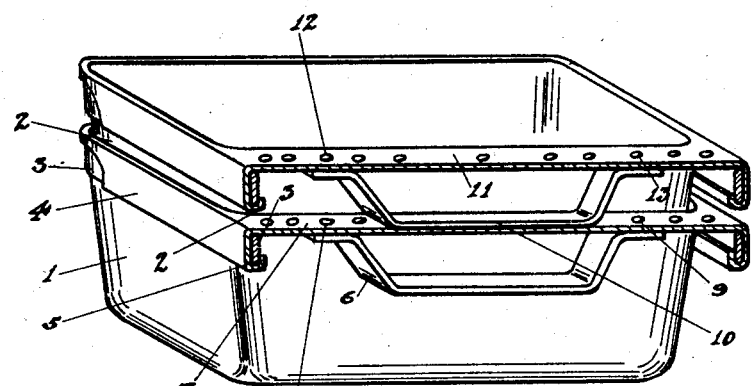
Figure 2:
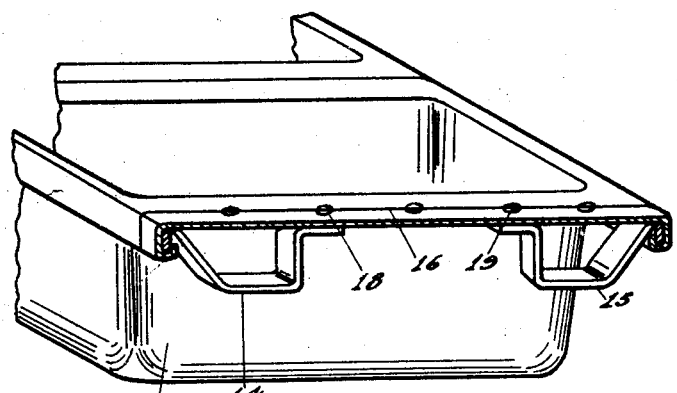
Figure 3:
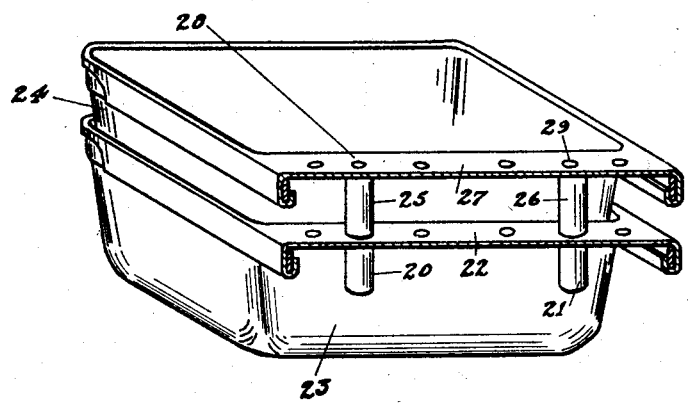
Figure 4:
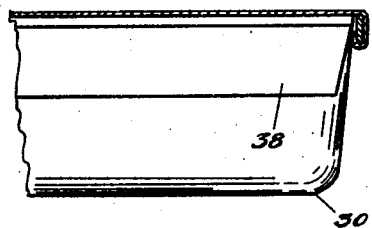
Figure 5:
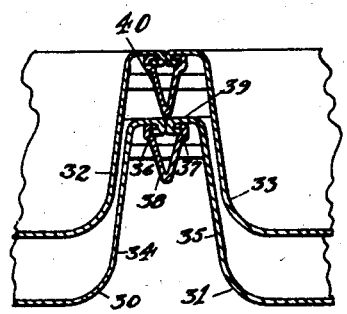
Figure 6:
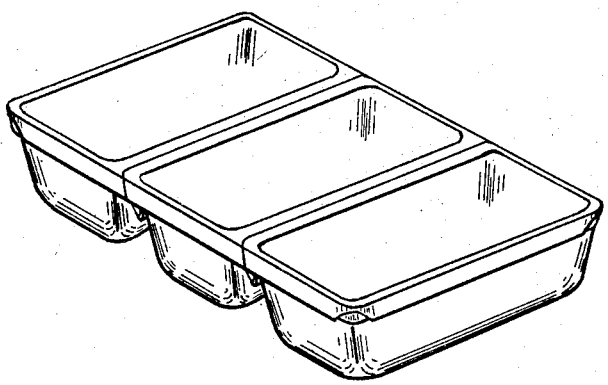

July 24, 1928.  
J. G. JACKSON  
BAKING PAN  
Filed June 8, 1927  
1,678,008  
2 Sheets-Sheet 1

Joseph George Jackson.  
Inventor.  
*W. A. Darrah.*  
Attorney.

July 24, 1928.

J. G. JACKSON

BAKING PAN

Filed June 8, 1927

1,678,008

2 Sheets-Sheet 2

Joseph George Jackson.
Inventor.
W. A. Darrah
Attorney.

Patented July 24, 1928.

1,678,008

UNITED STATES PATENT OFFICE.

JOSEPH GEORGE JACKSON, OF CHICAGO, ILLINOIS.

BAKING PAN.

Application filed June 8, 1927. Serial No. 197,387.

This invention relates to containers formed from sheet metal and frequently from tin plate. Containers of this kind are widely used in the baking industry, particularly by wholesale bakeries for the making of bread, cake and similar articles.

The object of this invention is to provide a simple, efficient, economical equipment with certain mechanical advantages both in handling and using which will be later set forth.

Referring to the drawing:

Fig. I shows a perspective view of a portion of two sets of pans made in accordance with one form of my invention;

Fig. II shows a broken away portion of a set of pans made in accordance with my invention, but slightly modified from the structure shown in Fig. I.

Fig. III shows a portion of two sets of pans made in accordance with an additional modification of my invention;

Figs. IV and V show details of a still further modification of a form of my invention;

Fig. VI shows in perspective a set of pans made in accordance with my invention.

It will be understood that my invention may be applied to one pan or a set of pans, but under present commercial conditions pans of the type commonly used are manufactured most often in groups or sets of any number ranging from two to in some cases six or eight. It will be understood that the number of pans in the set has no bearing on my invention.

The pans may be constructed individually in a great many ways the drawings merely showing one preferred form.

Referring to the drawings:

(1) represents a pan constructed in accordance with my invention, while (2) represents a second pan of a second set also constructed in accordance with my invention. Referring to Fig. I, it will be noted that pan (2) is nested into pan (1) which is common procedure among bakeries in handling pans in order to conserve space and make handling easier and cheaper. Pan (1) is provided with a deck (2) and is surrounded by a strap member (3) which reinforces the entire set.

The pans are shown as being drawn from a single sheet of metal which is a preferred construction, but not essential as the pans may be folded or shaped by any desired process.

In the construction of pans shown in Fig. I the metal which forms the deck or edge portion of the pan is folded around strap member (3) as indicated by a fold (4) and for purposes of strength and reinforcing is curled upward as indicated by edge (5). In the space between adjacent pans, I have placed a spacing member (6) which for purposes of illustration is shown as formed from a strap attached to the deck portion (7) by rivets (8) and (9). Obviously the strap may be arranged in any desired contour or fastened in any desired manner to the deck. (6) indicates the strap member attached to deck portion (7) on pan (1) while (10) represents another spacing member or strap attached to deck portion (11) of pan (2) by rivets (12) and (13).

Fig. II shows a modified arrangement in which two individual straps (14) and (15) are attached to deck (16) of pan (17) by means of rivets (18) and (19) respectively. The arrangement shown in Fig. II merely gives an alternative or additional method for providing spacing devices.

In Fig. III another alternative or additional means is indicated by the cylinders (20) and (21) which are attached to deck portion (22) of pan (23). A second pan (24) is shown nested in pan (23) and spaced therefrom by spacing members (25) and (26) respectively which are supported from deck (27) in a manner similar to spacers (20) and (21) in the case of pan (23). The spacers may be spot welded to their respective decks or their ends may be provided with a shoulder which may be riveted over as indicated by (28) and (29) on pan (24). If desired the deck portion (22) may be provided with a series of holes (29) to permit circulation of heated gases therethrough, thus giving a uniform distribution of heat.

Referring now to Figures IV and V (30) and (31) represent two adjacent pans in the same set, while (32) and (33) represent adjacent pans in a set nested in the first set. Fig. V shows a portion of two nested sets of pans in section and it will be noted that the two adjacent side portions (34) and (35) of the lower set of pans are bent backward upon themselves as indicated by (36) and (37) being interlocked with a separate additional piece of sheet metal (38) which projects downward from the deck portion (39) forming, therefore, a spacer or separator having a similar function to those previously illustrated. It will be noted that the upper spacer member (40) rests at its lower point on deck portion (39) thus serving to limit the distance that the two sets of pans may be nested.

Fig. VI shows in perspective a set of pans of the type here under discussion.

It will be apparent from the above description that I have provided means for separating sets of pans when nested so that they will not become wedged or forced together due to their own weight or the method of handling. This is of great importance in the case of certain sets of pans in that if pans become tightly wedged together they are slow to cool, hard to handle and separate, and also likely to be dented or deformed. It will be understood that many possible variations of my device can be made and still come within the scope of this invention. Thus the actual shape, size, thickness or composition of the material is not essential. It is, of course, desirable to make a strong rugged structure which will stand the strains and abuse of commercial handling.

Having now fully described my invention what I claim as new and wish to secure by Letters Patent in the United States is as follows:

1. In a multiple of baking pans, united together by flat deck portions extending horizontally an appreciable distance to form a set, a spacing means attached to the underside of said deck portions of said pans and serving to limit the distance between individual sets of said pans when nested.

2. A multiple of pans united together to form a set, a reinforcing member serving to unite said pans into a set, said pans being united together over a portion at least of their adjacent upper edges, and forming a flat deck portion extending horizontally an appreciable distance and a depending spacing member attached to said deck portion of said pans and located in the space between adjacent pans.

3. In a baking pan a flat deck portion extending horizontally an appreciable distance and surrounding said pan and a depending spacing member attached to said deck portion.

4. A multiple of pans united together to form a set, attachment means for uniting the adjacent edges of said pans of said set, to form a flat deck portion extending horizontally an appreciable distance and a spacing member attached to said deck portion for spacing said pans when nested.

JOSEPH GEORGE JACKSON.